United States Patent [19]

Ordo

[11] Patent Number: 4,727,770
[45] Date of Patent: Mar. 1, 1988

[54] PLANETARY GEAR SET AND ASSEMBLY METHOD

[75] Inventor: Richard A. Ordo, Greenwood, Ind.

[73] Assignee: General Motors Corporation, Detroit, Mich.

[21] Appl. No.: 831,869

[22] Filed: Feb. 24, 1986

[51] Int. Cl.[4] ............................................. F16H 3/44
[52] U.S. Cl. ................................... 74/785; 74/750 R
[58] Field of Search ............. 74/339, 785, 788, 750 R; 29/467, 468, 274

[56] References Cited

U.S. PATENT DOCUMENTS

| | | | |
|---|---|---|---|
| 1,491,481 | 4/1924 | Huetter | 74/339 |
| 1,706,109 | 3/1929 | Dodge | 74/785 |
| 2,291,420 | 7/1942 | Swenson | 29/467 |
| 2,480,866 | 9/1949 | Lusk | 29/274 |
| 3,280,650 | 10/1966 | Clement | 74/339 |
| 3,396,610 | 8/1968 | Rich, Jr. et al. | 74/785 |
| 3,450,242 | 6/1969 | Heidrich | 74/785 |
| 3,510,926 | 5/1970 | Oess | 29/468 |
| 3,983,764 | 10/1975 | Hicks | 74/410 |
| 4,472,869 | 9/1984 | Yasui et al. | 29/434 |
| 4,564,994 | 1/1986 | Marx | 29/274 |
| 4,604,908 | 8/1986 | Dolan | 74/788 |

FOREIGN PATENT DOCUMENTS 84-02964  8/1984  PCT Int'l Appl. .................. 74/339

Primary Examiner—Leslie Braun
Assistant Examiner—David Novais
Attorney, Agent, or Firm—Saul Schwartz

[57] ABSTRACT

A planet gear set and method of assembling the carrier on the sun and ring gear particularly suited for automation of the carrier assembly operation. The sun gear of the planetary set has a staging annulus formed on one end thereof defined between the addendum and dedendum circles of the sun gear teeth. The sun gear also has a frustoconical concentricity chamfer formed on the same end with one edge contiguous with dedendum circle edge of the staging annulus. The carrier, with the planet gears thereon, is aligned on the axis of rotation of the sun gear and advanced toward the same. If the sun gear is eccentric relative to its axis of rotation, the planet gears engage the concentricity chamfer and cam the sun gear to an aligned position which is achieved when the carrier achieves a staged position relative to the sun gear. In the staged position, the addendum circles of the planet gears are tangent to the dedendum circle edge of the staging annulus. The carrier is then mildly biased toward the sun gear and rotated, whereupon the teeth of the planet gears sequentially achieve meshing engagement with the sun gear teeth.

5 Claims, 2 Drawing Figures

PLANETARY GEAR SET AND ASSEMBLY METHOD

RELATED APPLICATION

The subject matter of this application relates to the subject matter of copending U.S. patent application Ser. No. 707,391 now U.S. Pat. No. 4,640,294, filed Mar. 1, 1985 by Richard A. Ordo and assigned to the assignee of this invention.

BACKGROUND OF THE INVENTION

1. Field of the Invention

This invention relates generally to planetary gear type automotive transmissions and, more particularly, to a planetary gear set and method of assembling the same in an automated operation.

2. Description of the Prior Art

In assembling planetary gear type automotive transmissions, it is common practice to mount the transmission case on a fixture which permits end-for-end inversion of the case so that internal components can be installed from opposite ends of the case. It is also common to install a planetary gear set in a sequence which includes installation of the sun gear and ring gear of the set on the case before the planet gears and planet carrier of the set. As an element of this last mentioned step, the planet gears, which are already mounted on the carrier and independently rotatable relative to each other, are usually "timed" on either the sun gear or the ring gear. Timed, as the term is used herein, means meshing engagement of all of the planet gears with one of the sun and ring gear (hereinafter the "timing gear") before engagement of any of the planet gears with the other of the sun and ring gears. After the planet gears are timed on the timing gear, they easily mesh with the other of the sun and ring gear because the planet gears then rotate in unison. A robot for automatically performing this last step can be programmed to advance the carrier along a fixed axis and to rotate it about that axis but may require expensive machine vision technology because the necessary precise alignment of the planet carrier on the axis of rotation of the timing gear may not be easily achieved due to manufacturing tolerances in the components of the transmission and the end-for-end inversions of the case. Where the ring gear is part of a disc clutch assembly, as is common, the assembly procedure is even more difficult because the ring gear may bear a markedly eccentric relationship to the sun gear. The planetary gear set and assembly method according to this invention enables the planet carrier assembly operation to be performed by a robot, without machine vision technology, programmed only to advance the carrier along an axis and to rotate the carrier about that axis.

SUMMARY OF THE INVENTION

This invention is a new and improved planetary gear set and an assembly method for assembling the planet carrier with the planet gears thereon between the sun gear and the ring gear where the latter two gears are installed on a support structure prior to the carrier. The new and improved planetary gear set includes locating means on the timing gear which positions the planet carrier in a staged position relative to the timing gear wherein the axes of rotation of the carrier and the timing gear are colinearly aligned with each of the planet gears disposed in a plane perpendicular to the axis of rotation of the carrier so that when the carrier is rotated and mildly biased toward the timing gear, the planet gears quickly and easily achieve meshing engagement with the timing gear. The means whereby the planet carrier is staged relative to the timing gear includes a staging annulus on an end of the timing gear in a plane perpendicular to the axis of rotation of the timing gear and a centering shoulder or concentricity chamfer on the timing gear having one edge contiguous with the staging annulus, the staging annulus being defined by and between the addendum and dedendum circles of the timing gear and being interrupted by the tooth spaces between the timing gear teeth. In a preferred embodiment of the planetary gear set and assembly method according to this invention, the timing gear is the sun gear so that during advancement of the carrier the planet gears contact the concentricity chamfer and cam the sun gear into alignment on the axis of rotation of the planet carrier which alignment is achieved in the staged position of the carrier relative to the sun gear, the staged position being characterized by engagement of an end of each of the planet gears on the sun gear on the staging annulus. Also in the preferred embodiment, a disc clutch is disposed between the ring gear and the support structure and a frustoconical bevel surface is formed on an end of the ring gear overlapping the ends of the ring gear teeth so that after the planet gears are timed on the sun gear and further advanced toward the ring gear while the carrier rotates, the teeth on the planet gears engage the bevel surface and cam the ring gear into alignment on the axis of rotation of the carrier and then substantially simultaneously achieve meshing engagement with the ring gear teeth.

DESCRIPTION OF THE PREFERRED EMBODIMENT

Figure 1:
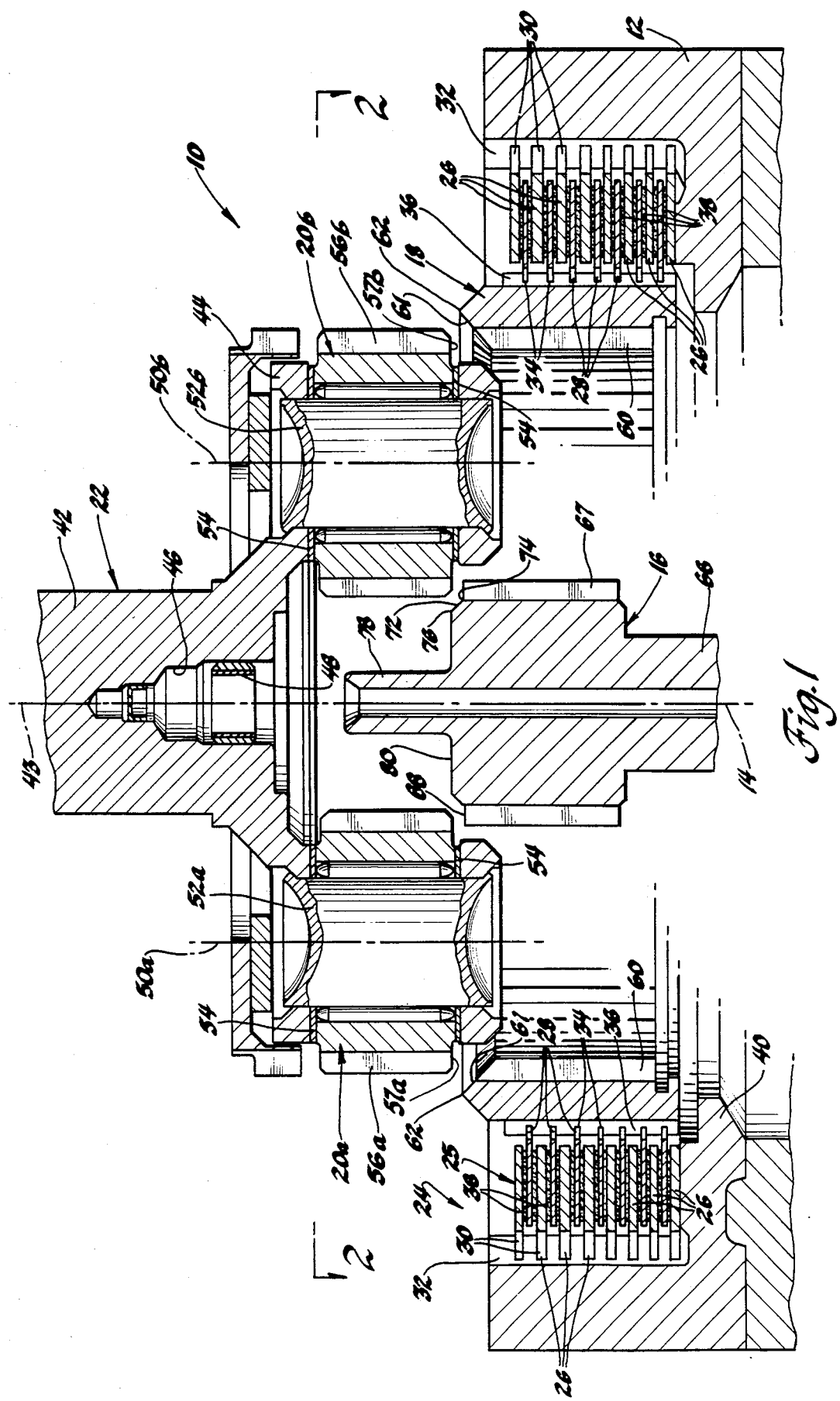
FIG. 1 is an elevational view of a planetary gear set according to this invention undergoing assembly by the assembly method according to this invention.

Referring now to the drawings, a planetary gear set 10 according to this invention is to be assembled onto a supporting structure 12, such as a transmission case, which defines a main axis 14 fixed relative to the case. The planetary gear set 10 includes a sun gear 16, a ring gear 18, a plurality of planet gears 20a–d and a planet carrier 22. The ring gear 18 is connected to the case 12 through a disc clutch 24.

The disc clutch 24 includes a clutch pack 25 consisting of a plurality of outer discs 26 and a plurality of inner discs 28 interleaved between the outer discs. Each outer disc has a circumferential array of outer spline teeth 30 slidably engaged in a corresponding plurality of spline grooves 32 in the case 12 centered about the axis 14. Each of the inner discs 28 has an internal circumferential array of spline teeth 34 slidably engaged in a corresponding plurality of spline grooves 36 in the ring gear which are parallel to the axis 14 when the ring gear is centered about or aligned on the axis. Each of the inner discs 28 has a friction lining 38 on each face of the disc which slidably engages an opposing face on the adjacent one of the outer discs 26.

The clutch pack 25 is stacked against an annular backing plate 40 on the case 12 and engaged by an annular piston, not shown, which compresses the clutch pack against the backing plate. When the clutch is thus engaged, the ring gear 18 is held stationary relative to the case and when the clutch is released the ring gear is freely rotatable relative to the case as the inner discs 28 rotate relative to the stationary outer discs 26. The ring gear and the attached inner discs 28 are free to translate in planes perpendicular to the axis 14 by an amount corresponding generally to the clearance between the inner diameters of the outer discs 26 and the outer diameter of the ring gear which circumscribes the spline grooves 36.

The planet carrier 22 includes a cylindrical shaft portion 42 having a longitudinal axis 43 and an annular cage portion 44 integral with the shaft portion. The shaft portion 42 has an internal pilot bore 46 at one end thereof in which is supported a pilot bearing 48. The cage portion 44 defines a plurality of planet axes 50a–d parallel to and disposed in a circle about the longitudinal axis 43 of the cylindrical shaft portion 42. A plurality of axle pins 52a–d are rigidly supported on the cage portion 44 and aligned on the corresponding ones of the planet axes 50a–d. Each of the planet gears 20a–d is rotatably supported on a corresponding one of the axle pins 52a–d for rotation about the corresponding one of the planet axes. The planet gears are separated from the cage portion 44 by a plurality of annular thrust bearings 54.

Each of the planet gears has an array of gear teeth 56a–d thereon which extend the length of the planet gears parallel to the planet axes 50a–d. One end of each of the planet gears is machined in a plane perpendicular to the planet axes 50a–d to form an annulus 57a–d extending radially inward from the addendum circle 58a–d of the gear to inboard of the dedendum circle 59a–d of the gear. The annuli 57a–d are interrupted by the tooth space between the planet gear teeth 56a–d. The annuli 57a–d are generally coplanar. However, they are not exactly coplanar due to manufacturing tolerances in the thrust bearings 54 and in the planet gears 20a–d.

The ring gear 18 has an internal circumferential array of gear teeth 60 thereon adapted for meshing engagement with the gear teeth 56a–d on the planet gears. At the end thereof opposite the backing plate 40, the ring gear 18 has an internal bevel defining a frustoconical bevel surface 61 extending radially inward from an annular peak 62 radially outboard of the dedendum circle 63 of the ring gear teeth to the addendum circle 64 of the ring gear teeth. The bevel surface 61 is interrupted by the tooth spaces between the ring gear teeth 60.

Figure 2:
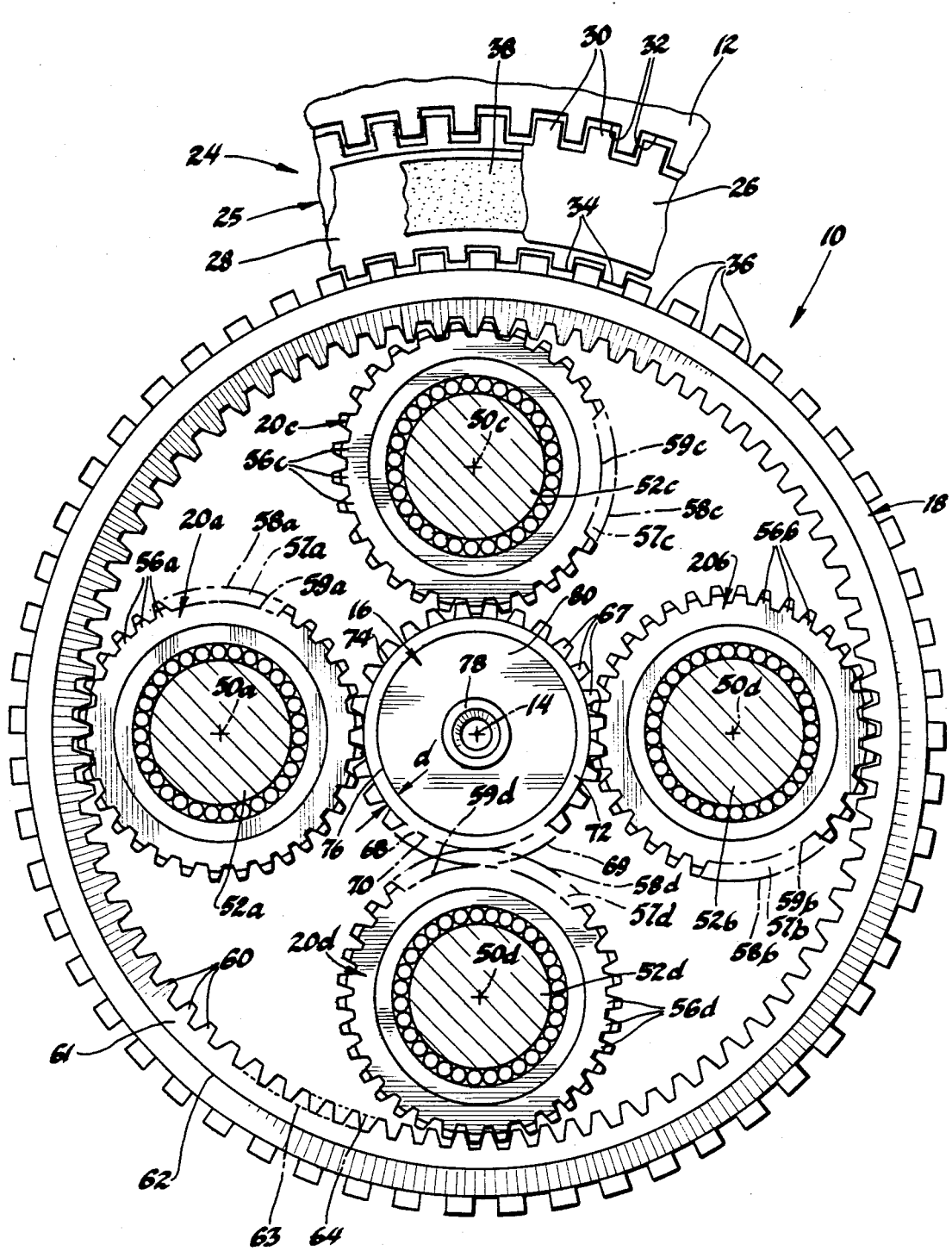
FIG. 2 is a sectional view taken generally along the plane indicated by lines 2—2 in FIG. 1.

The sun gear 16 is disposed on the end of a transmission shaft 66 mounted on the case 12 for rotation about the axis 14. The sun gear has an array of gear teeth 67 extending generally the length of the sun gear. The sun gear is machined at one end in a plane perpendicular to the longitudinal axis of the gear, not specifically illustrated, to define a staging annulus 68 bounded at its radially outermost extremity by the addendum circle 69 of the sun gear teeth 67 and at its radially innermost extremity by the dedendum circle 70 of the sun gear teeth. Each of the gear teeth 67 terminates in the staging annulus 68 so that the latter is regularly interrupted by the tooth spaces between the gear teeth 67. A frustoconical guide shoulder or concentricity chamfer 72 on the sun gear has a radially outermost edge 74 contiguous with the dedendum circle 70 defining the innermost edge of the staging annulus 68 and a radially innermost edge 76. In plan view, FIG. 2, the concentricity chamfer projects as an annulus having a radial depth d. The sun gear 16 further includes an integral cylindrical pilot 78 aligned on the longitudinal axis of the sun gear and projecting from an end surface 80 of the sun gear. The pilot 78 engages the pilot bearing 48 whereby the distal end of shaft 66 is rotatably supported on the carrier 22.

In a typical transmission assembly scenario, the transmission case 12 is inverted end for end several times as components are installed from opposite ends in a sequence most convenient for the particular transmission. For example, it may be convenient to assemble the clutch pack 25 and the ring gear 18 onto the case with the spline grooves 32 facing up, as depicted in FIG. 1, followed by an inversion of the case and installation of the shaft 66 with the sun gear 16 thereon from the opposite end of the case followed by yet another inversion of the case and final assembly of the planet carrier 22. At the occurrence of each inversion, the already assembled components usually migrate to one extreme position in their tolerance range under the influence of gravity as the case pivots. Accordingly, in the step of assembling the carrier 22 with the planet gears 20a–d thereon between the sun gear and the ring gear, a situation is encountered wherein the longitudinal axis of the sun gear will typically not coincide with the longitudinal axis 14 of the transmission case and the ring gear 18 will typically exhibit a marked eccentricity relative to the sun gear.

With the ring gear and sun gear not aligned on the axis 14, simple robotic performance of the carrier assembly step proceeds as follows. The assembly robot, programmed for gripping the carrier 22 with the longitudinal axis 43 of the shaft portion 42 held in colinear alignment with the longitudinal axis 14 of the transmission case and for selectively advancing the carrier along the axis and rotating the same about the axis, grips the carrier and transports the same to a position aligned on the axis 14 above the sun gear and the ring gear. The carrier 22 is then advanced along the axis 14 toward the sun gear until one or more of planet gears 20a–d, at the addendum circles 58a–d thereof, engages the sun gear on the concentricity chamfer 72. The particular one or more of the planet gears which first engage the sun gear depends upon the random eccentricity of the sun gear relative to the axis 14. The planar projection d of the concentricity chamfer is correlated with the maximum amount of eccentricity which the sun gear may exhibit so that the planet gears, at the addendum circles thereof, will always first engage the sun gear on the concentricity chamfer.

Continued advancement of the planet carrier 22 toward the sun gear after initial engagement on the concentricity chamfer 72 results in development of a camming force between the planet gears and the sun gear whereby the latter is forced in a direction perpendicular to the axis 14. The carrier 22 is advanced under a longitudinally applied force sufficient to affect camming until it achieves a staged position relative to the sun gear 16 wherein the annuli 57a–d on the planet gears overlap and abut the staging annulus 68 on the sun gear. In the staged position of the carrier, each of the addendum circles 58a–d of the planet gears is generally tangent to the outer edge 74 of the concentricity chamfer so that the sun gear 16 is substantially precisely aligned on the axis 14.

In the staged position of the carrier relative to the sun gear 16, the planet axes 50a–d are parallel to the main axis 14 of the transmission case. The ends of one or more of the planet gear teeth 56a–d, however, rest on the ends of the sun gear teeth 67 in the staging annulus 68 so that continued advancement of the planet carrier is blocked. With a relatively mild bias of the carrier 22 toward the sun gear, the carrier is rotated about the axis 14 so that the edges of planet gear teeth 56a–d sweep across the staging annulus 68. Because of the slight bias toward the sun gear and because of the aforementioned lack of precise coplanar alignment of each of the annuli 57a–d on the planet gears, sequential meshing engagement of the planet gear teeth 56a–d is quickly achieved as the planet gear teeth sweep across the staging annulus and encounter the tooth spaces between the sun gear teeth 67.

With the planet gears 20a–d thus timed on the sun gear and rotating in unison as the carrier rotates, the carrier 22 is further advanced along the axis 14. The planet gear teeth 56a–d progressively further longitudinally overlap the sun gear teeth 67 as one or more of the planet gears, at the addendum circles 58a–d thereof, engage the eccentrically located ring gear 18 on the frustoconical bevel surface 61. The location of the engagement between the planet gears and the frustoconical bevel surface is randomly determined by the particular eccentricity of the ring gear. If initial engagement of the planet gears on the frustoconical bevel surface 61 is radially outboard of the dedendum circle 63 of the ring gear teeth 60, a camming force is developed by the planet gears on the ring gear 18 whereby the latter is translated perpendicular to the axis 14. When the addendum circles 58a–d of the planet gears are tangent to the dedendum circle 63 of the ring gear teeth, the planet gear teeth 56a–d simultaneously mesh with the ring gear teeth because of the timed rotation of the planet gears relative to the ring gear. The carrier 22 is then advanced to the fully assembled position with the planet gears disposed squarely between the ring gear 18 and the sun gear 16.

The embodiments of the invention in which an exclusive property or privilege is claimed are defined as follows:

1. In the assembly of a planetary gear set on a support defining a main axis,
    said planetary gear set including
        a sun gear having a plurality of gear teeth and disposed on said support for rotation about said main axis and for limited translation in a plane perpendicular to said main axis between aligned and eccentric positions relative to said main axis,
        a ring gear having a plurality of gear teeth and disposed on said support for limited translation in a plane perpendicular to said main axis between aligned and eccentric positions relative to said main axis,
        a plurality of planet gears each having a plurality of gear teeth adapted to mesh with said ring gear teeth and said sun gear teeth, and
        a planet carrier supporting each of said planet gears for rotation about respective ones of a corresponding plurality of parallel planet axes of said planet carrier,
    a method of timing said planet gears on one of said sun gear and said ring gear comprising the steps of:
    forming a staging annulus in a plane perpendicular to said main axis on one end of said one gear having a first edge defined by the addendum circle of said gear teeth on said one gear and a second edge defined by the dedendum circle of said gear teeth,
    said staging annulus being interrupted by the tooth spaces between said gear teeth on said one gear,
    forming on said one gear a frustoconical concentricity chamfer having one edge contiguous with said second edge of said staging annulus,
    aligning said carrier on said main axis and advancing said carrier toward said one gear until said carrier achieves a staged position relative to said one gear wherein said planet gears abut said one gear on said staging annulus with the addendum circles of each of said planet gears tangent to said second edge of said staging annulus,
    at least one of said planet gears engaging said one gear on said concentricity chamfer when said one gear is in said eccentric position and camming said one gear to said aligned position when said planet carrier achieves said staged position on said staging annulus,
    biasing said carrier toward said one gear, and
    effecting relative rotation between said carrier and said one gear so that said planet gears sequentially achieve meshing engagement with said one gear.

2. A method of assembling a
    planetary gear set on a support defining a main axis,
    said planetary gear set including
        a sun gear having a plurality of gear teeth and disposed on said support for rotation about said main axis and for limited translation in a plane perpendicular to said main axis between aligned and eccentric positions relative to said main axis,
        a ring gear having a plurality of gear teeth and disposed on said support for limited translation in a plane perpendicular to said main axis between aligned and eccentric positions relative to said main axis,
        a plurality of planet gears each having a plurality of gear teeth adapted to mesh with said ring gear teeth and said sun gear teeth, and
        a planet carrier supporting each of said planet gears for rotation about respective ones of a corresponding plurality of parallel planet axes of said carrier,
    said method comprising the steps of:
    forming a staging annulus in a plane perpendicular to said main axis on one end of one of said ring gear and said sun gear having a first edge defined by the addendum circle of said gear teeth on said one of said ring gear and said sun gear and a second edge defined by the dedendum circle of said gear teeth,
    said staging annulus being interrupted by the tooth spaces between said gear teeth on said one of said ring gear and said sun gear,
    forming on said one of said ring gear and said sun gear a frustoconical concentricity chamfer having one edge contiguous with said second edge of said staging annulus,
    aligning said carrier on said main axis and advancing said carrier toward said one of said sun gear and said ring gear until said planet carrier achieves a staged position relative to said one of said sun gear and said ring gear wherein said planet gears abut said one of said sun gear and said ring gear on said staging annulus with the addendum circles of each of said planet gears tangent to said second edge of said staging annulus, at least one of said planet gears engaging said one of said sun gear and said ring gear on said concentricity chamfer when said one gear is in said eccentric position and camming said one gear to said aligned position when said planet carrier achieves said staged position, biasing said carrier toward said one of said sun gear and said ring gear, effecting relative rotation between said carrier and said one of said sun gear and said ring gear so that said planet gears sequentially achieve meshing engagement with said one gear, forming on one end of the other of said sun gear and said ring gear a frustoconical bevel surface overlapping the ends of said gear teeth on said other of said sun gear and said ring gear, and further advancing said planet carrier toward said other of said sun gear and said ring gear and rotating said planet carrier to achieve substantially simultaneous meshing engagement between each of said planet gears and said other of said sun gear and said ring gear, at least one of said planet gears engaging said other of said sun gear and said ring gear on said frustoconical bevel surface when said other gear is in said eccentric position and camming said other gear to said aligned position.

3. In a planetary gear set in an automotive transmission having a transmission case defining a main axis of said transmission, said planetary gear set including a sun gear having a plurality of gear teeth and disposed on said transmission case for rotation about said main axis and for limited translation in a plane perpendicular to said main axis between aligned and eccentric positions relative to said main axis, a ring gear having a plurality of gear teeth and disposed on said transmission case for limited translation in a plane perpendicular to said main axis between aligned and eccentric positions relative to said main axis, a plurality of planet gears each having a plurality of gear teeth adapted to mesh with said sun gear teeth and said ring gear teeth, a planet carrier, and means mounting each of said planet gears on said planet carrier for rotation about respective ones of a plurality of parallel planet axes of said carrier, the combination comprising:

means on one end of said sun gear defining a staging annulus in a plane perpendicular to said main axis having a first edge defined by the addendum circle of said sun gear teeth and a second edge defined by the dedendum circle of said sun gear teeth, said staging annulus being interrupted by the tooth spaces between said sun gear teeth, means on said sun gear defining a frustoconical concentricity chamfer having one edge contiguous with said second edge of said staging annulus, at least one of said planet gears engaging said sun gear on said concentricity chamfer when said sun gear is in said eccentric position and when said carrier is aligned on said main axis and advanced toward said sun gear, said planet gears camming said sun gear to said aligned position when said planet carrier achieves a staged position relative to said sun gear wherein said planet gears abut said sun gear on said staging annulus with the addendum circles of each of said planet gears tangent to said second edge of said staging annulus, and means on said ring gear defining a frustoconical bevel surface extending from the addendum circle of said ring gear teeth to beyond the dedendum circle of said ring gear teeth, at least one of said planet gears engaging said ring gear on said frustoconical bevel surface when said ring gear is in said eccentric position and camming said ring gear to said aligned position when said carrier is aligned on said main axis and advanced toward said ring gear.

4. A method of assembling a planetary gear set on a support defining a main axis, said planetary gear set including a sun gear having a plurality of gear teeth and disposed on said support for rotation about said main axis and for limited translation in a plane perpendicular to said main axis between aligned and eccentric positions relative to said main axis, a ring gear having a plurality of gear teeth and disposed on said support for limited translation in a plane perpendicular to said main axis between aligned and eccentric positions relative to said main axis, a plurality of planet gears each having a plurality of gear teeth adapted to mesh with said ring gear teeth and said sun gear teeth, and a planet carrier supporting each of said planet gears for rotation about respective ones of a corresponding plurality of parallel planet axes of said carrier, said method comprising the steps of:

forming on one end of said sun gear a staging annulus in a plane perpendicular to said main axis having a first edge defined by the addendum circle of said sun gear teeth and a second edge defined by the dedendum circle of said sun gear teeth, said staging annulus being interrupted by the tooth spaces between said sun gear teeth, forming on said sun gear a frustoconical concentricity chamfer having one edge contiguous with said second edge of said staging annulus, aligning said carrier on said main axis and advancing said carrier toward said sun gear until said planet carrier achieves a staged position relative to said sun gear wherein said planet gears abut said sun gear on said staging annulus with the addendum circles of each of said planet gears tangent to said second edge of said staging annulus, at least one of said planet gears engaging said sun gear on said concentricity chamfer when said sun gear is in said eccentric position and camming said sun gear to said aligned position when said planet carrier achieves said staged position, biasing said carrier toward said sun gear, effecting relative rotation between said carrier and said sun gear so that said planet gears sequentially achieve meshing engagement with said sun gear, forming on one end of said ring gear a frustoconical bevel surface overlapping the ends of said ring gear teeth, and further advancing said planet carrier toward said ring gear and rotating said planet carrier to achieve substantially simultaneous meshing engagement between each of said planet gears and said ring gear, at least one of said planet gears engaging said ring gear on said frustoconical bevel surface when said ring gear is in said eccentric position and camming said ring gear to said aligned position.

5. In a planetary gear set in an automotive transmission having a transmission case defining a main axis of said transmission, said planetary gear set including a sun gear having a plurality of gear teeth and disposed on said transmission case for rotation about said main axis and for limited translation in a plane perpendicular to said main axis between aligned and eccentric positions relative to said main axis, a ring gear having a plurality of gear teeth, a plurality of outer clutch discs spline connected to said transmission case, a plurality of inner clutch discs disposed between respective pairs of said outer clutch discs and spline connected to said ring gear radially outboard of said ring gear teeth whereby said ring gear is disposed on said transmission case for limited translation in a plane perpendicular to said main axis between aligned and eccentric positions relative to said main axis, a plurality of planet gears each having a plurality of gear teeth adapted to mesh with said sun gear teeth and said ring gear teeth, a planet carrier, and means mounting each of said planet gears on said planet carrier for rotation about respective ones of a plurality of parallel planet axes of said carrier, the combination comprising: means on one end of said sun gear defining a staging annulus in a plane perpendicular to said main axis having a first edge defined by the addendum circle of said sun gear teeth and a second edge defined by the dedendum circle of said sun gear teeth, said staging annulus being interrupted by the tooth spaces between said sun gear teeth, means on said sun gear defining a frustoconical concentricity chamfer having one edge contiguous with said second edge of said staging annulus, at least one of said planet gears engaging said sun gear on said concentricity chamfer when said sun gear is in said eccentric position and when said carrier is aligned on said main axis and advanced toward said sun gear, said planet gears camming said sun gear to said aligned position when said planet carrier achieves a staged position relative to said sun gear wherein said planet gears abut said sun gear on said staging annulus with the addendum circles of each of said planet gears tangent to said second edge of said staging annulus, and means on said ring gear defining a frustoconical bevel surface extending from the addendum circle of said ring gear teeth to beyond the dedendum circle of said ring gear teeth, at least one of said planet gears engaging said ring gear on said frustoconical bevel surface when said ring gear is in said eccentric position and camming said ring gear to said aligned position when said carrier is aligned on said main axis and advanced toward said ring gear.

* * * * *